(12) United States Patent
Cipolla

(10) Patent No.: US 11,260,467 B1
(45) Date of Patent: Mar. 1, 2022

(54) CANISTER AND METHOD OF PRODUCTION

(71) Applicant: Steven A. Cipolla, Warwick, RI (US)

(72) Inventor: Steven A. Cipolla, Warwick, RI (US)

(73) Assignee: National Chain Company, Warwick, RI (US)

(*) Notice: Subject to any disclaimer, the term of this patent is extended or adjusted under 35 U.S.C. 154(b) by 0 days.

(21) Appl. No.: 16/940,584

(22) Filed: Jul. 28, 2020

Related U.S. Application Data

(60) Provisional application No. 62/880,811, filed on Jul. 31, 2019, provisional application No. 62/880,339, filed on Jul. 30, 2019.

(51) Int. Cl.
| | |
|---|---|
| *B23K 20/00* | (2006.01) |
| *B23K 20/04* | (2006.01) |
| *B65D 1/16* | (2006.01) |
| *B65D 1/18* | (2006.01) |
| *B65D 65/40* | (2006.01) |
| *B32B 15/01* | (2006.01) |
| *C21D 3/02* | (2006.01) |
| *C22F 1/18* | (2006.01) |
| *B23K 103/04* | (2006.01) |
| *B23K 103/08* | (2006.01) |
| *B23K 101/12* | (2006.01) |

(52) U.S. Cl.
CPC .............. *B23K 20/04* (2013.01); *B32B 15/01* (2013.01); *B65D 1/16* (2013.01); *B65D 1/18* (2013.01); *B65D 65/40* (2013.01); *C21D 3/02* (2013.01); *C22F 1/18* (2013.01); *B23K 2101/12* (2018.08); *B23K 2103/04* (2018.08); *B23K 2103/08* (2018.08); *B32B 2439/02* (2013.01)

(58) Field of Classification Search
CPC ................................ B23K 20/02; B23K 20/04
See application file for complete search history.

(56) References Cited

U.S. PATENT DOCUMENTS

| | | | | |
|---|---|---|---|---|
| 2,894,321 A | * | 7/1959 | Dubilier ................. | B23K 20/02 228/115 |
| 2013/0112565 A1 | * | 5/2013 | Filson ................... | C25D 11/022 205/122 |

OTHER PUBLICATIONS

AZO Materials ("The Effect of Elements on the Properties of Stainless Steel", https://www.azom.com/article.aspx?ArticleID=2119, Aug. 19, 2003) (Year: 2003).*

* cited by examiner

*Primary Examiner* — Erin B Saad
(74) *Attorney, Agent, or Firm* — Salter & Michaelson

(57) ABSTRACT

A method of forming a canister by means of a mechanical bonding of respective layers of a first metal material (tantalum) and a second metal material (niobium) to form a sheet stock, thereby forming the sheet stock into a canister form, wherein the first metal material comprises tantalum and the second metal material comprises at least one of niobium, molybdenum, or steel. The completed canister comprises a first metal material comprising tantalum, and a second metal material mechanically bonded to the first metal material by subjecting the first and second metal materials to at least 1,000,000 psi, to thereby form a canister having an inner diameter of 13-19 millimeters (mm), the second metal material comprising at least one of niobium, molybdenum, or steel.

16 Claims, 5 Drawing Sheets

CANISTER AND METHOD OF PRODUCTION

RELATED CASES

Priority for this application is hereby claimed under 35 U.S.C. § 119(e) to commonly owned U.S. Provisional Patent Application Nos. 62/880,339 filed on Jul. 30, 2019 and 62/880,811 which was filed on Jul. 31, 2019, and each of which is incorporated by reference herein in its entirety.

FIELD OF THE INVENTION

The present invention relates in general to an improved product that combines two different materials in order to produce a more affordable product. The product of the present invention also relates to an improved method for providing this product.

SUMMARY OF THE INVENTION

The present invention enables the bonding of two alloys into a single sheet stock by rolling layers of these materials under pressure in order to bond the two layers together. The bonded layers form a sheet stock that can be formed into a canister. The two materials that are mechanically bonded include a first metal material comprising tantalum and a second material comprising at least one of niobium, molybdenum, or steel.

A method of forming a canister by means of a mechanical bonding of respective layers of a first metal material and a second metal material to form a sheet stock, thereby forming the sheet stock into a canister form, wherein the first metal material comprises tantalum and the second metal material comprises at least one of niobium, molybdenum, or steel.

In the method, with respect to the canister, an inner layer can be comprised of the first material and an outer layer can be comprised of the second material, wherein the second material comprises niobium. In the method, with respect to the canister, an inner layer can be comprised of the first material and an outer layer can be comprised of the second material, wherein the second material comprises molybdenum. In the method, with respect to the canister, an inner layer can be comprised of the first material and an outer layer can be comprised of the second material, wherein the second material comprises steel. In the method, the sheet stock can be comprised of at least 30% tantalum. The method can further include brushing exterior surfaces of the first metal material and the second metal material to deoxidize the first metal material and the second metal material prior to performing the mechanical bonding. In the method, the first metal material and the second metal material each have a purity of at least 99.9%. In the method, the means of mechanical bonding can be cladding with at least one roller of at least 1,000,000 psi to mechanically bond the first metal material together with the second metal material. In the method, the formed canister can have a body that is cylindrical or square in shape. In the method, the canister can have an inner diameter in the range of 13-19 millimeters (mm).

A method includes brushing exterior surfaces of a first metal material to deoxidize the first metal material, the first metal material comprising tantalum, brushing exterior surfaces of a second metal material to deoxidize the second metal material, the second metal material comprising at least one of niobium, molybdenum, or steel, and bonding the first metal material and the second metal material together in a sheet stock mechanically by applying a pressure of at least 1,000,000 psi to thereby form the sheet stock into a canister such that the first material is an inner layer of the canister and the second material is an outer layer of the canister.

In the method, the canister can be comprised of more of the first material than the second material. In the method, the canister can be comprised of more of the second material than the first material.

A canister according to the present disclosure includes a first metal material comprising tantalum, and a second metal material mechanically bonded to the first metal material by subjecting the first and second metal materials to at least 1,000,000 psi, to thereby form a canister having an inner diameter of 13-19 millimeters (mm), the second metal material comprising at least one of niobium, molybdenum, or steel.

The canister can be comprised of more of the first material than the second material. The canister can be comprised of more of the second material than the first material. The canister can be formed by further brushing an exterior surface of the first metal material and the second metal material to deoxidize the first metal material and the second metal material prior to the mechanical bonding. In the canister, the first metal material and the second metal material each have a purity of at least 99.9%. In the canister, a body of the canister can be cylindrical in shape.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
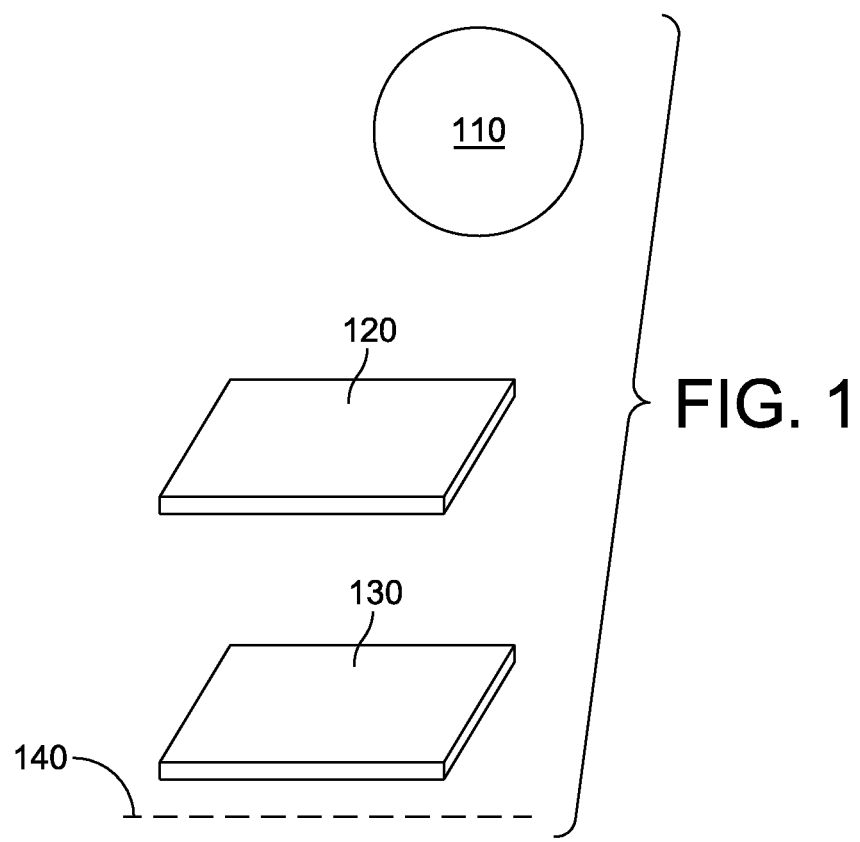
FIG. 1 is an exploded view illustrating a first step in the process.

In accordance with the present invention as illustrated in FIGS. 1-4, there is provided a bonding of two alloys together into a sheet stock 200. These two alloys are a first material 120 which, for example, can be tantalum and a second metal material which, for example, can be niobium, molybdenum, or steel. These materials are to be rolled together under pressure to mechanically bond the two layers together to form the sheet stock 200. In FIG. 1 the layers are illustrated as in exploded view with the first metal material 120 and the second metal material 130 with the pressure applied being indicated by the roller 110. The roller can press the two layers 120, 130 together against a surface 140, which may be a flat surface, a second roller, or another structure as appropriate to form the canisters in according with the present disclosure.

Figure 2:
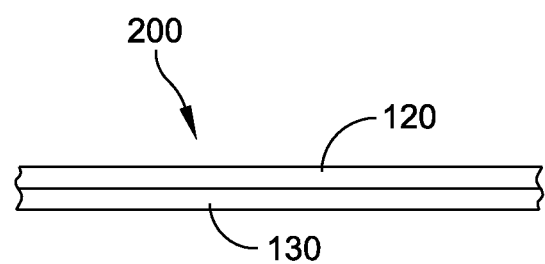
FIG. 2 is an illustration of the produced sheet stock.
Figure 2A:
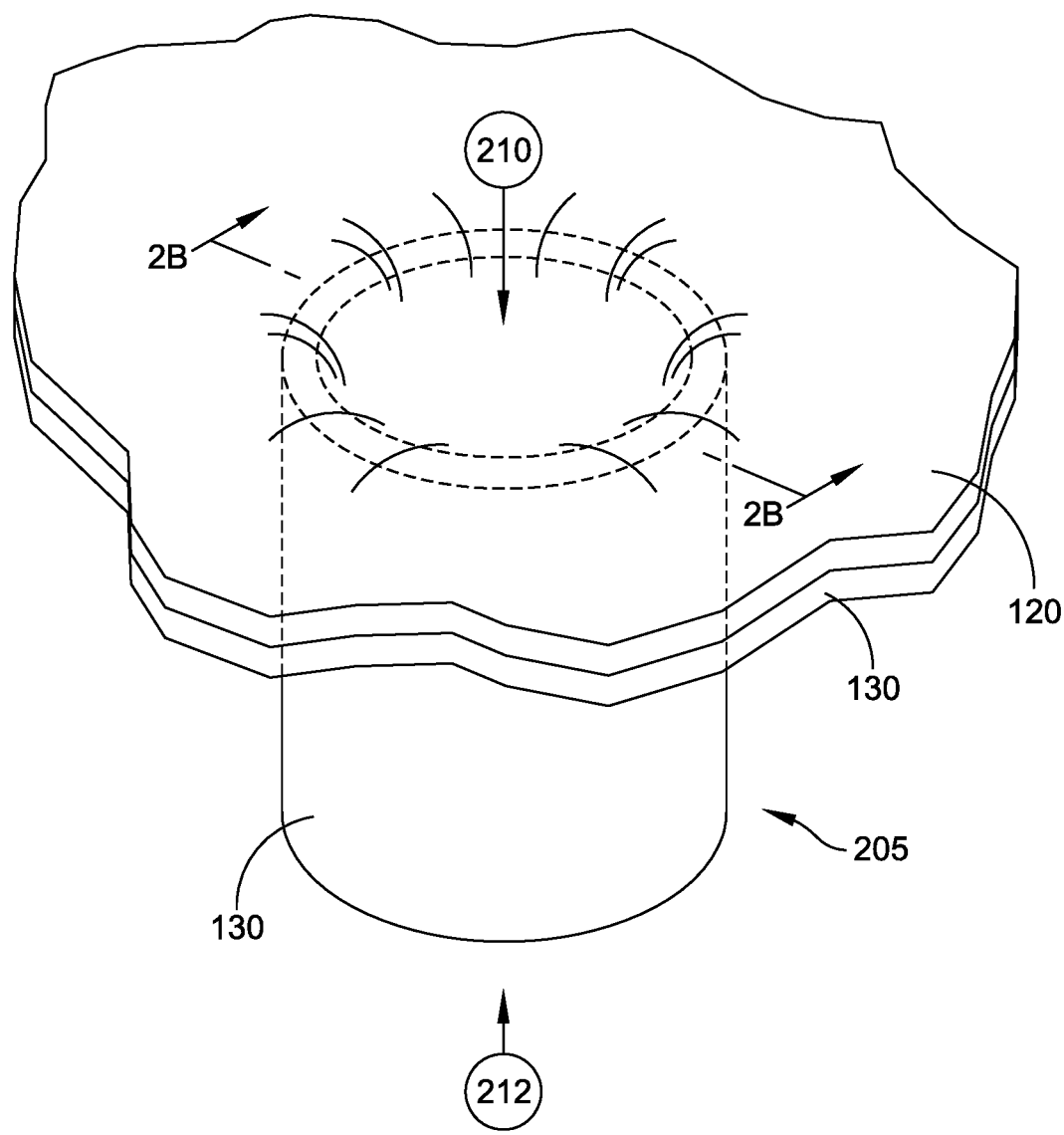
FIG. 2A illustrates the sheet stock formed into the final canister product.
Figure 2B:
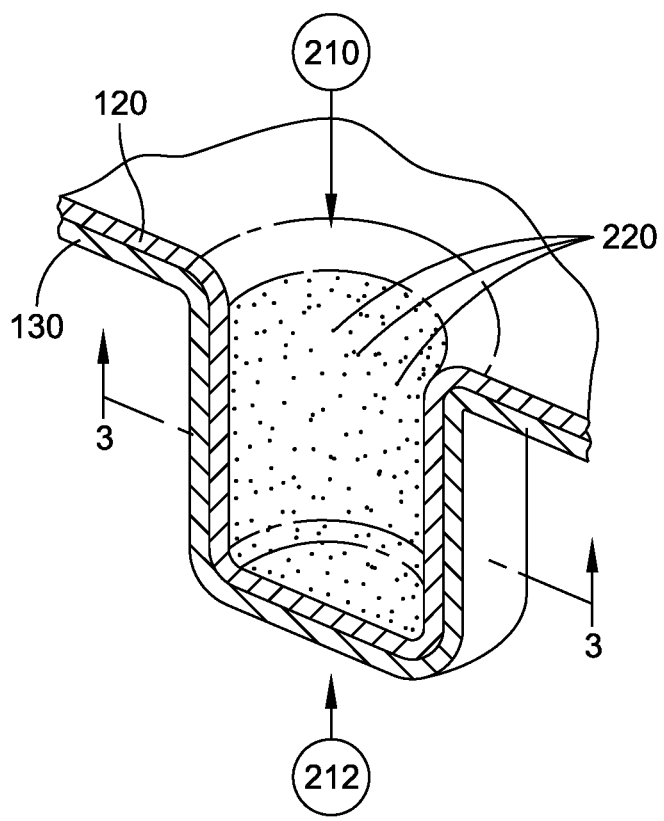
FIG. 2B illustrates a cross-sectional view as taken across lines 2B-2B of FIG. 2A.
Figure 3:
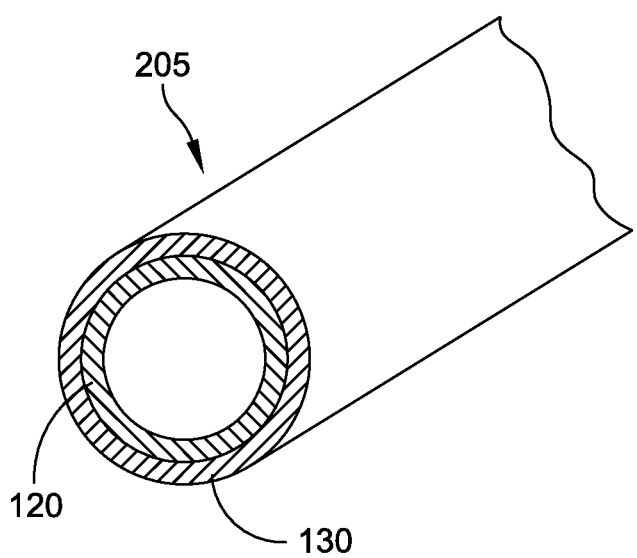
FIG. 3 illustrates a cross-sectional view of the final canister product as taken along line 3-3 of FIG. 2B.

Reference may now be made to the fragmentary cross-sectional view of FIG. 2 that shows these two layers 120 and 130 as formed into the sheet stock 200. The sheet stock is then formed by means of a deep draw stamp into canister 205 as illustrated in FIG. 2A-FIG. 3. These canisters 205 may be used in the diamond fabrication industry. It will be appreciated that the two layers 120 and 130 can be formed into the sheet stock 200, and then at a later time, or in a subsequent processing step, can be formed into the canister as shown in FIG. 2A. The two layers 120 and 130 can, instead of being formed into the sheet stock and then into the canister in two separate steps, can be formed into the canister simultaneously at the same time that the layers are mechanically bonded together, using an appropriate roller 110 and rolling surface 140 to achieve the desired canister shape. For example, the rolling surface 140 can be a cup having the same shape as the canister, such that when a roller presses the metal layers downward into the cup, the canister forms the shape of the cup. The excess material surrounding the top of the canister 205, for example as shown in FIGS. 2A and 2B, can be removed to reveal the canister only that can be used in forming the diamond part. In other embodiments, the excess material can remain for the PDC drill forming portion.

It is known in the art prior to the present application that canisters are made only of niobium as this is a less expensive material than tantalum, however it is less robust and niobium alone can often penetrate through to the underlying diamond tool. On the contrary, a purely tantalum canister does not risk the penetration that can occur from niobium; however tantalum is very expensive. The anti-leakage properties of the tantalum indicate there are advantages to providing a layer of tantalum. Thus in accordance with the present invention a cladding of the two layers is formed where the benefit of both materials can be taken advantage of, with the less expensive niobium forming part of the canister structure that is able to withstand the high melting point (3000° F. or more) but that has the tantalum material in proximity to the diamond tool so that any leakage is prevented or at least reduced as much as possible. This clad material provides a better performing canister with the inside surface formed of tantalum and the outside surface formed of the less expensive niobium. This clad together material provides the polycrystalline diamond canister a better performing product at an affordable price.

The amount of tantalum material as compared to the amount of the second metal material is variable within ordinary skill, depending upon the particular application. For example, some applications may be require a thicker or greater amount of the first material as compared to the second material, or vice versa some applications may require a thicker or greater amount of the second material as compared to the first material. The sheet stock in one example can be comprised of 30% tantalum, or any value in the range of 10-60% tantalum. The sheet stock can be 50% of each material. The first metal material and the second metal material should have a purity of at least 99.9% to ensure proper mechanical bonding of the materials during the bonding process.

In one embodiment the thickness of the outer layer 130 has a ratio relative to the thickness of the inner layer 120 which may be on the order of 2/1 or, more particularly, the ratio may be on the order of 3/1 or even more particularly, the ratio may be on the order of 4/1.

In accordance with the present invention there is thus provided a mechanical bonding between the layers 120 and 130. This is formed into a single sheet stock shown at 200 in FIG. 2. The percentages of each of the layers can be varied as well as the respective thicknesses. As has been indicated, this clad strip is used in the production of deep drawn and stamped parts; refer to FIG. 3. These parts may be used in particular for applications in the PCD diamond industry.

In an embodiment of the present invention instead of providing the niobium layer as layer 130 there are other materials that can be used to form a canister in the same manner. For example, both molybdenum and steel may be used along with the tantalum layer. Thus, in one embodiment the respective layers shown in FIG. 2 would be tantalum and molybdenum and in the second embodiment, it would be tantalum and steel. In both embodiments the tantalum forms the inner layer regarding the formation of the canister. Other metal alloys other than niobium, molybdenum, or steel, may be used, to achieve the desired outcome according to the present disclosure.

In accordance with the PCD diamond industry, the canister is used to form a PDC drill bit within the canister. This can be accomplished by adding diamond particles to the interior of the canister (as indicated by the particles 220 shown in FIG. 2B). Thereafter, carbide is added to the canister, and a PDC drill bit is thus formed by the interaction of the diamond particles with the carbide. The tantalum on the interior surface of the canister provides the necessary interface such that the PCD diamond can be formed within the canister. The canister can thereafter be removed to reveal the PCD drill bit.

Figure 3A:
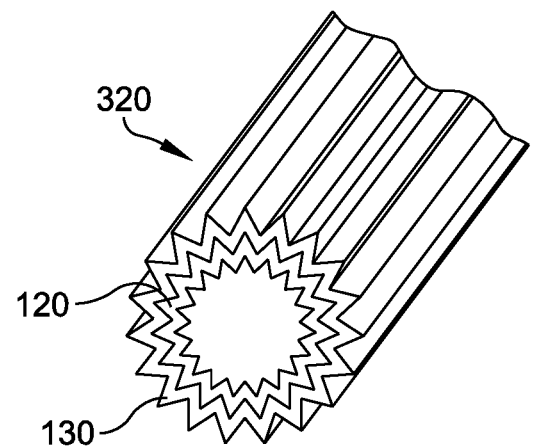
FIG. 3A illustrates an alternate cross-sectional shape for the final canister, with the shape being a multi-sided star.

FIG. 3A illustrates an alternate cross-sectional shape for the final canister, with the canister 320 being a multi-sided star. In this configuration, the first metal material 120 is still on an interior of the canister 320 and the second metal material 130 is on an exterior of the canister 320.

Figure 3B:
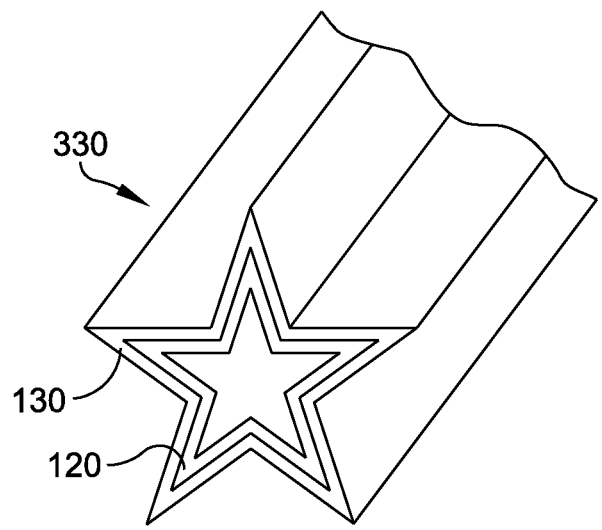
FIG. 3B illustrates another alternate cross-sectional shape for the final canister, with the shape being a regular 5-sided star.

FIG. 3B illustrates another alternate cross-sectional shape for the final canister, with the canister 330 being a regular 5-sided star. In this configuration, the first metal material 120 is still on an interior of the canister 330 and the second metal material 130 is on an exterior of the canister 330.

Figure 3C:
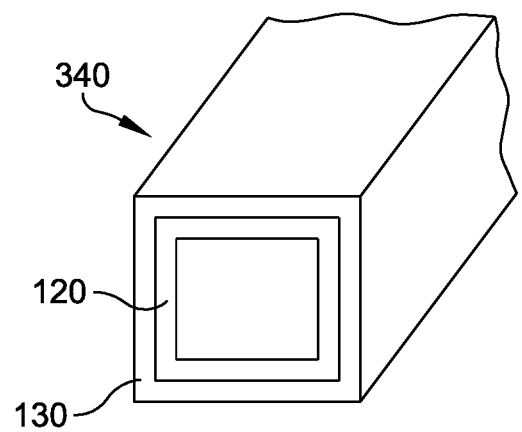
FIG. 3C illustrates still another alternate cross-sectional shape for the final canister, with the shape being square.

FIG. 3C illustrates still another alternate cross-sectional shape for the final canister, with the canister 340 being square in shape. In this configuration, the first metal material 120 is still on an interior of the canister 340 and the second metal material 130 is on an exterior of the canister 340.

It should be appreciated that the square- and star-shaped canisters are only example shapes, and other shapes and configurations can be implemented within ordinary skill to achieve the desired shape for the resulting PCD tool that will be formed within the canister.

Figure 4:
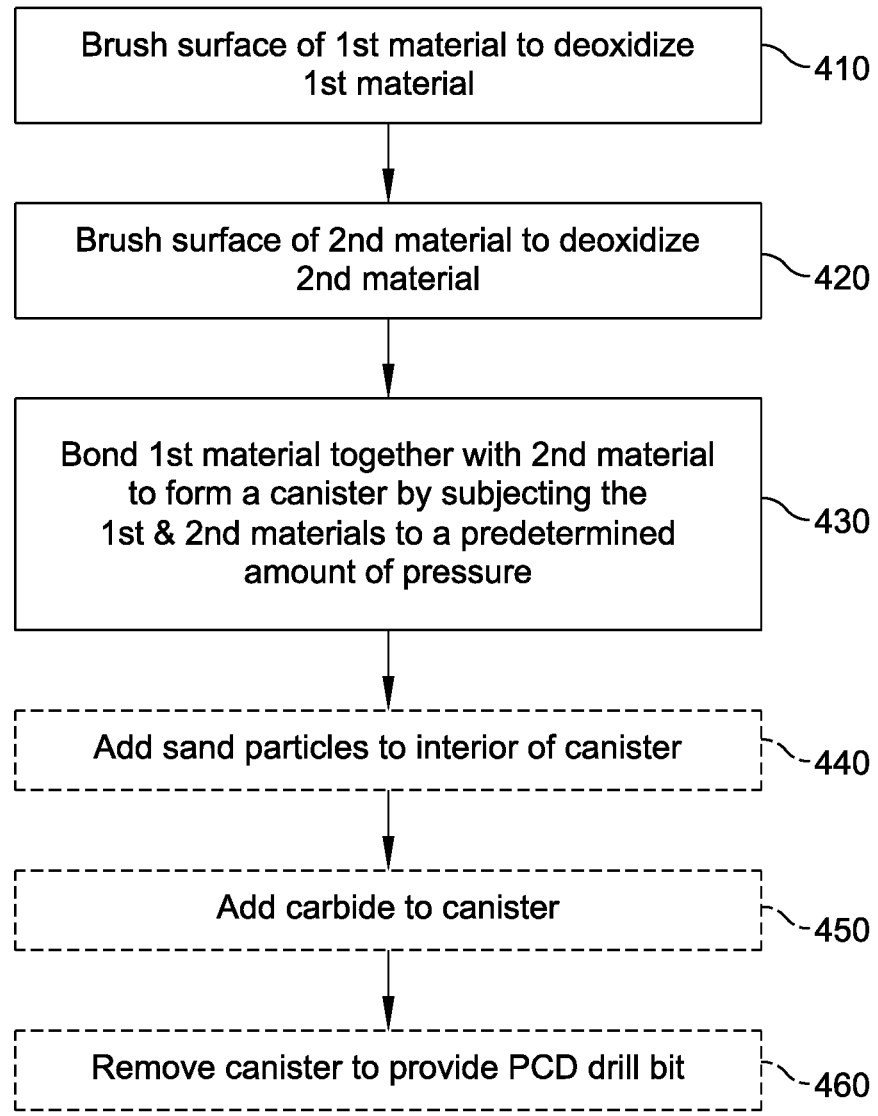
FIG. 4 illustrates a flow chart of a method of forming a canister according to the present disclosure.

FIG. 4 illustrates a flow chart of a method of forming a canister according to the present disclosure. At block 410, the surface of the first material is brushed (e.g., with a metal brush) to deoxidize the first material. At block 420, the surface of the second material is brushed (e.g., with a metal brush) to deoxidize the second material. The brushing is not required to achieve the canister of the present disclosure, however it achieves a superior product to deoxidize the metal materials.

At block 430, the first material is clad or otherwise mechanically bonded to the second material to form a canister. The canister can have any shape as will be appreciated in light of the present disclosure, including but not limited to the canister shown in FIG. 2A, FIG. 2B, FIG. 3, FIG. 3A, FIG. 3B, or FIG. 3C. This can be accomplished by a roller pressing the first material and the second material together against a rolling surface under a predetermined amount of pressure, such as a pressure of at least 1,000,000 psi. This canister can be used to form a PCD drill bit according to the subsequent block 440, 450, and 460. It will be appreciated that bonding the first material and the second material together can be accomplished simultaneously with forming the stack into a canister, or the materials can be bonded into a sheet stock together by a first mechanical bonding, and then the sheet stock can be subsequently formed into a canister in a second processing step.

At block 440, diamond particles can be added to the interior of the canister, for example as shown in FIG. 2B with particles 220 on the interior of the canister 205. The diamond particles are deposited on the interior tantalum layer in this embodiment. This provides a canister that is able to withstand the high melting point during the bonding process, that affords a layer of tantalum that is sufficient such that leakage of the PCD into the canister material does not occur.

At block 450, carbide is then added to the interior of the canister. The diamond particles and the carbide interact to form a PCD drill bit. The canister can then be removed at block 460 to reveal the PCD drill bit having the shape of the interior of the canister. The canister has an interior diameter generally of 13-19 millimeters (mm).

Having now described a limited number of embodiments of the present invention, it should now be apparent to those skilled in the art that numerous other embodiments and modifications thereof are contemplated as falling within the scope of the present invention, as defined by the appended claims.

The invention claimed is:

1. A method of forming a canister comprised of respective layers of a first metal material and a second metal material to form a sheet stock, thereby forming the sheet stock into a canister form, wherein the first metal material comprises a tantalum layer and the second metal material comprises a niobium layer, wherein the canister, when formed, has the tantalum layer as an inner layer and the niobium layer as an outer layer of the canister, wherein the sheet stock is comprised of at least 30% tantalum and at least 60% niobium.

2. The method of claim 1, further comprising brushing exterior surfaces of the first metal material and the second metal material to deoxidize the first metal material and the second metal material prior to performing the mechanical bonding.

3. The method of claim 1 wherein the first metal material and the second metal material each have a purity of at least 99.9%.

4. The method of claim 1 wherein the respective layers of tantalum and niobium are formed by cladding with at least one roller of at least 1,000,000 psi to mechanically bond the first metal material together with the second metal material.

5. The method of claim 1 wherein the canister has a body that is cylindrical in shape.

6. The method of claim 1, wherein the canister has a body that is square in shape.

7. The method of claim 1, wherein the canister has an inner diameter in the range of 13-19 millimeters (mm).

8. A method comprising:
brushing exterior surfaces of a first metal material to deoxidize the first metal material, the first metal material comprising tantalum;
brushing exterior surfaces of a second metal material to deoxidize the second metal material, the second metal material comprising niobium; and
bonding the first metal material and the second metal material together in a sheet stock mechanically by applying a pressure of at least 1,000,000 psi to thereby form the sheet stock into a canister such that the first metal material is an inner layer of the canister and the second metal material is an outer layer of the canister; wherein the sheet stock is comprised of at least 30% of the first metal material and at least 60% of the second metal material.

9. The method of claim 8, wherein the canister is comprised of more of the second material than the first material.

10. The method of claim 8 wherein, with respect to the canister, an inner layer is comprised of the first material and an outer layer is comprised of the second a material.

11. The method of claim 1, wherein the thickness of the second metal layer has a ratio relative to the thickness of the first metal layer which is selected from on the order of 2/1, on the order of 3/1 and on the order of 4/1.

12. The method of claim 1, wherein the thickness of the second metal layer has a ratio relative to the thickness of the first metal layer which is at least on the order of 2/1.

13. A method of forming a canister comprised of respective layers of a first metal material and a second metal material to form a sheet stock, thereby forming the sheet stock into a canister form, wherein the first metal material comprises a tantalum layer and the second metal material comprises a niobium layer, wherein the canister, when formed, has the tantalum layer as an inner layer and the niobium layer as an outer layer of the canister, further including the step of mechanical bonding by cladding the niobium and tantalum layers directly together, and without any other layer therebetween, and wherein the cladding occurs under a predetermined pressure; wherein the sheet stock is comprised of at least 30% of the first metal material and at least 60% of the second metal material.

14. The method of claim 13, wherein the pressure is applied to at least 1,000,000 psi, to thereby form the sheetstock.

15. The method of claim 13, wherein the thickness of the second metal layer has a ratio relative to the thickness of the first metal layer which is at least on the order of 2/1.

16. The method of claim 13, wherein the thickness of the second metal layer has a ratio relative to the thickness of the first metal layer which is selected from the order of 2/1, on the order of 3/1 and on the order of 4/1.

* * * * *